Aug. 12, 1958
C. E. ROESSLER, JR
2,846,892
SEQUENCE PROGRAM CONTROL
Filed Oct. 26, 1954
3 Sheets-Sheet 1
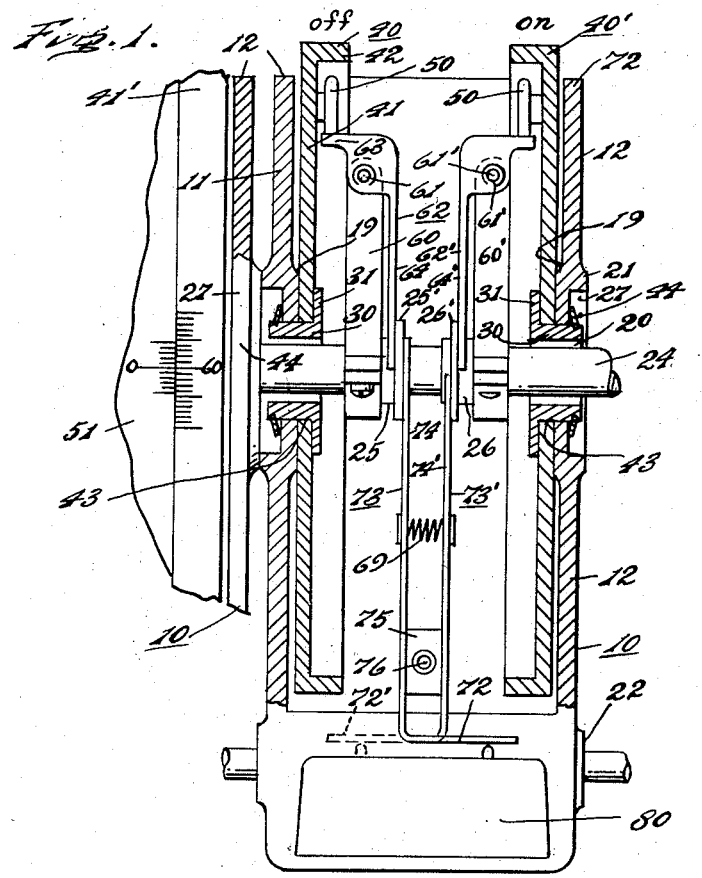
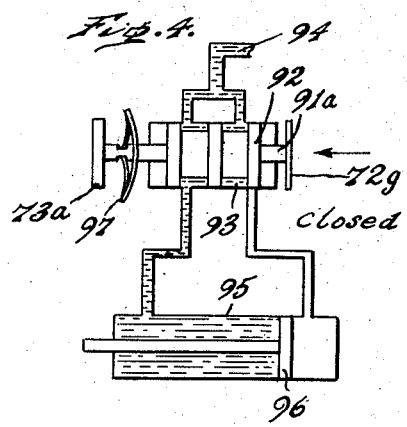
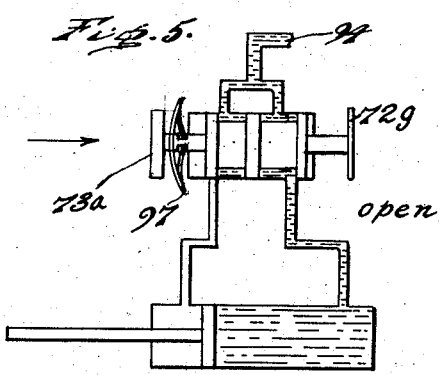
INVENTOR
Charles E. Roessler, Jr.
BY
Frank H. Borden
ATTORNEY

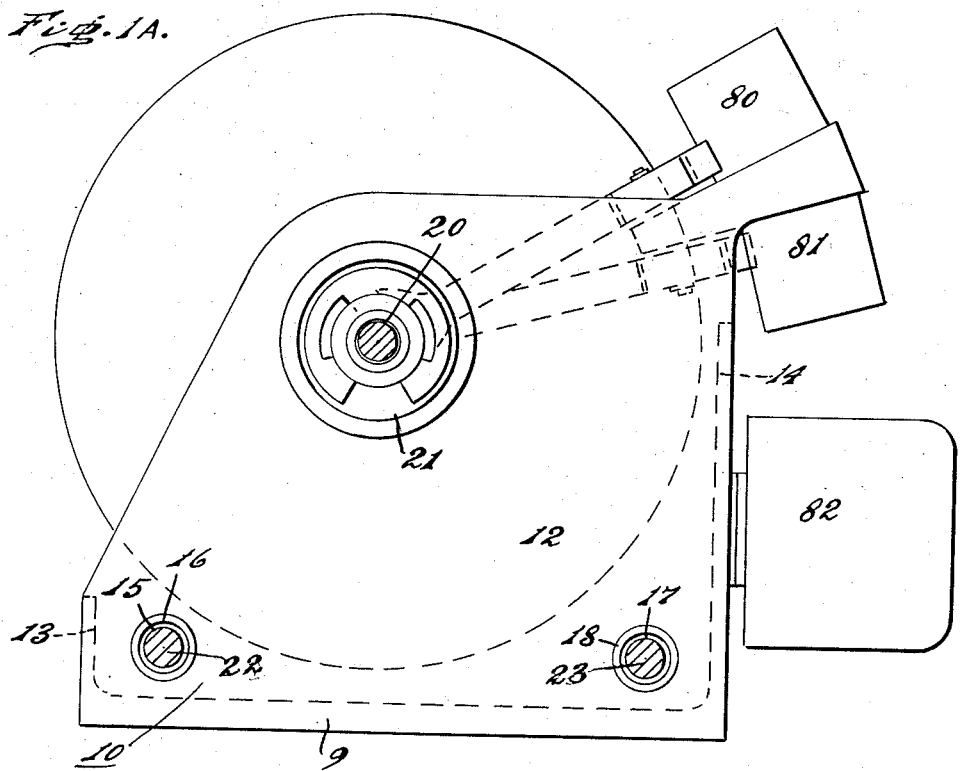
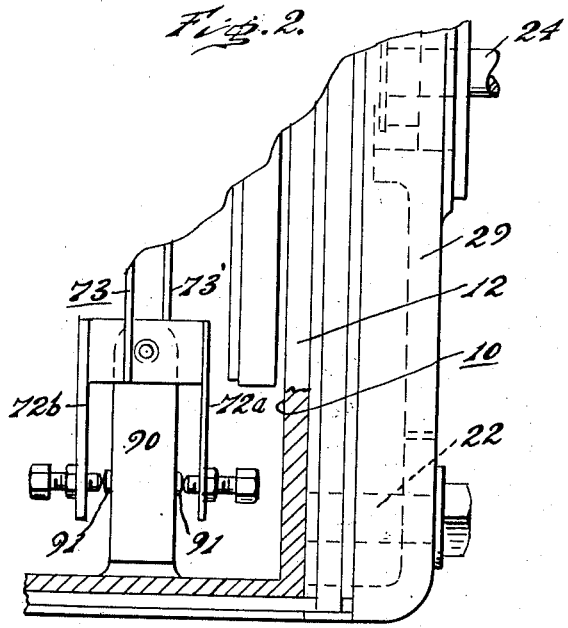
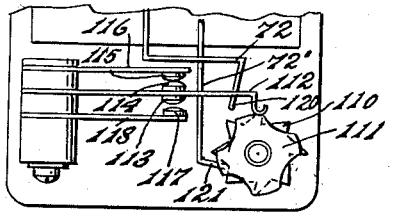

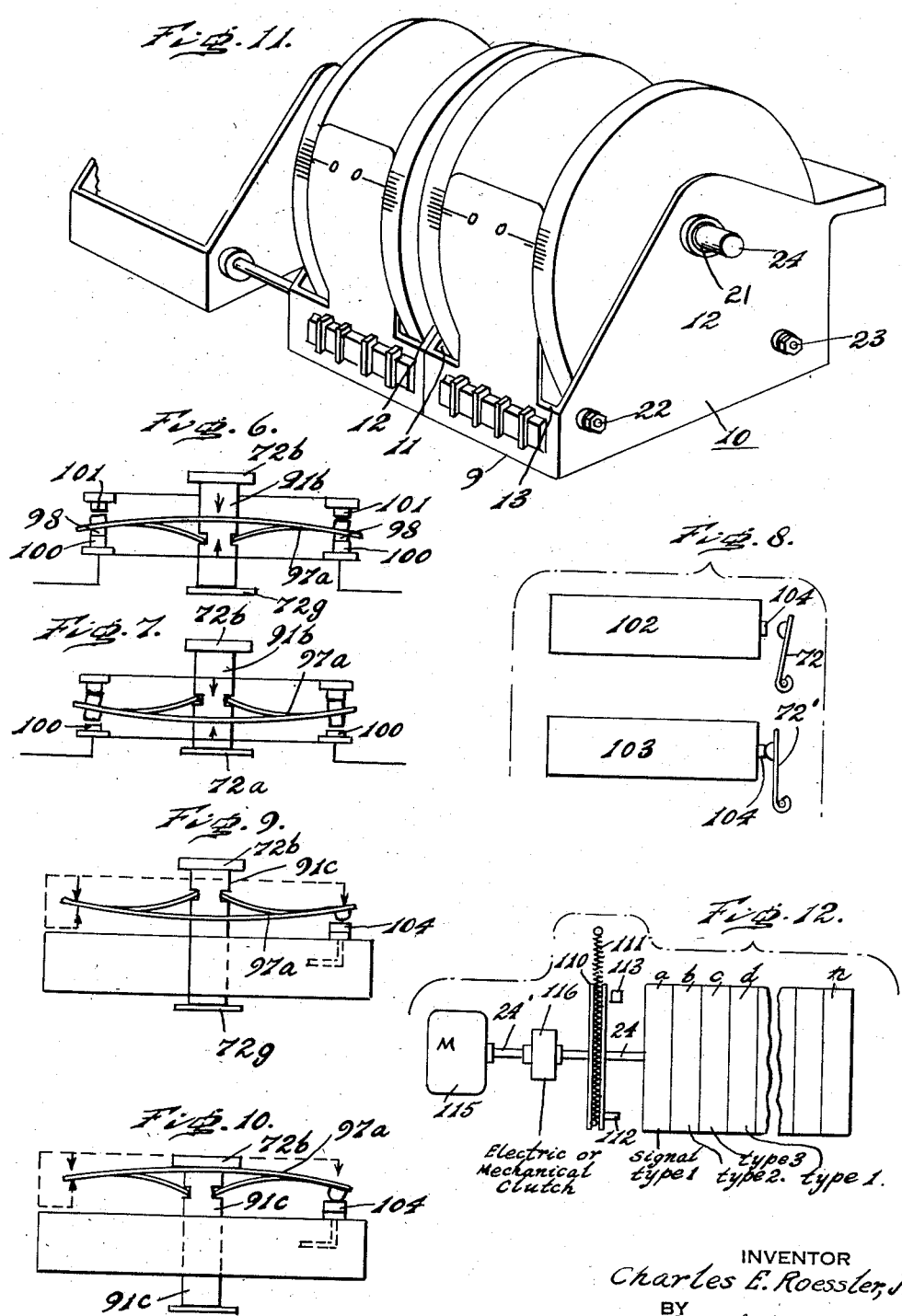

United States Patent Office 2,846,892
Patented Aug. 12, 1958

2,846,892

SEQUENCE PROGRAM CONTROL

Charles E. Roessler, Jr., Lafayette Hills, Pa.

Application October 26, 1954, Serial No. 464,669

2 Claims. (Cl. 74—54)

This invention relates to sequence program control contactors.

There are many industrial situations in which successive stages or steps of operation must be controlled in their sequence, and usually with controlled timing of the respective stages or steps, and the field of application of such sequence program controls is enlarging. Typical illustrative but definitely not limitative applications are in materials handling operations; electric, pneumatic or hydraulic program control; injection molding procedures; material forming press procedures; and successive mechanical or chemical operations on work.

There have been many attempts to provide automatic devices for accomplishing the sequence programming, but so far as known each previous proposal has had one or more disadvantageous feature militating against universality of application, or even elasticity in a given application. Assume, for instance, an industrial installation involving an appreciable number of steps or stages from the start of the operation to its conclusion. Assume further that the requirement is, illustratively, ten electric circuits to be operated in any desired sequence, with a given proportion of time "on" to time "off" at each stage or step. According to certain prior practices, a plurality of individual timers has been provided, two to each circuit, one of which is for time "on" and the other of which is for time "off." This requires twenty such timers. The expense and space requirements for such an organization is prohibitive. Moreover, each of such timers requires its own timer motor, and it is impossible in such an organization to actuate the program functionally with and by the operation of the given machine per se, regardless of time per se.

It has also been proposed to provide a timer motor driving a shaft on which a plurality of split cams are adjustably mounted, each rotating under spring contact fingers, with one-half of the cam unit controlling the time "on" and the other controlling time "off." While this concentrates the programmer to a better degree than the plurality of individual timer organizations mentioned, it has serious defects, including the sharp limitation on the angular setting of the respective cam halves to start the time "on" and also to start the time "off," inability to permit the organization to be run in reverse, inability to withstand the vibration of rugged machinery, difficulty of changing worn contacts, the excessive time required to vary the cam setting, and the danger of electric shock while changing the control sequence.

It is among the objects of this invention to provide a sequence program control which is elastic in the sense of being susceptible to any number of circuit controls with standardized parts; can effect a quick and accurate setting of the "on" contact at any point through 360° of travel of a shaft; can effect a quick and accurate setting of the "off" contact at any point through 360° of travel of the shaft; is composed of one or a plurality of identical, cheaply made, "units"; is susceptible to adjustment during the movement of the shaft; can effect almost instantaneous adjustment of a control circuit from a duration of almost, but not exactly, a complete revolution of the shaft, to a duration so short as to effect a mere signal "blip" and to cause the interruption of the protracted circuit terminated by such "blip" to occur at any point in the 360° of travel of the shaft; can run in reverse without mechanical damage; can run in reverse without losing the control sequence; can provide quick and easy replacement of switches; is immune to the vibration and shock of heavy machinery; can be changed as to the sequence settings without danger of shock; can be driven from either end of the programming organization; can be coupled to and driven by any rotatable part of an apparatus, or by its own motor, can effect repeat cycles, stop cycles, and reset cycles as desired; can be actuated by solenoid actuations or by selsyns; can be operated either to effect the controlled sequence of circuit-making and breaking or can be caused to effect the same result by controlling poppet valves for controlling fluid pressures, whether pneumatic or hydraulic; and is essentially cheap and economical to manufacture and assemble. Other objects and advantages will become more apparent as the description proceeds.

In the accompanying drawings:

Fig. 1 represents a front elevation, in fragmentary section of a plurality of laterally juxtaposed units in an assembled sequence controller of units.

Fig. 1a represents a fragmentary side elevation of one side of Fig. 1, partially in section.

Fig. 2 represents a similar fragmentary elevation, broken away, showing the details of the output ends of the lever organization with respect to a plunger passing through a controlled unit and positioned by the leverage system.

Fig. 3 represents a fragmentary section through the output ends of the lever organization effecting the actuation of a stepping cam and switch.

Figs. 4 and 5 represent schematic sections through an illustrative hydraulic switch organization controlled by the levers of a unit, in the respective opposite senses of operation thereof, and showing an illustrative servo motor piston as positioned thereby, as actuated, for instance, by the levers of Fig. 2.

Figs. 6 and 7 represent schematic diagrams of an illustrative electric switch organization as actuated, for instance, by the levers of Fig. 2, respectively showing a controlled circuit "on" and the controlled circuit "off."

Fig. 8 represents schematically a pair of poppet valves for controlling fluid pressures, as respectively unenergized and energized by the levers of a unit.

Figs. 9 and 10 represent schematically the operation of a poppet valve in opposite senses in accordance with the actuations of a plunger as controlled by the leverage of a unit, in the open condition in Fig. 9, and in the closed position in Fig. 10.

Fig. 11 represents a fragmentary isometric view of a programmer containing two units.

Fig. 12 represents a schematic elevation of an illustrative reset sequence programmer with "n" units, with representative units emitting "on" and "off" signals of various types, and illustrating a phase of the flexibility of the invention.

The fundamental unit of the organization is a unit consisting of mechanism for controlling one complete load circuit between angular motion "on" and angular motion "off." With the exceptions to be noted, according to the signal controls to be effected, all of the units are identical. The respective units are so formed that any one complete unit can be operatively associated in juxtaposition and lateral alignment with another unit on one side or both sides to form a sequence controller, controlling any desired number of individual load circuits according to the number of units incorporated in the system.

The basic unit is disclosed as comprising a, preferably cast, base portion 10, having a pair of parallel spaced side cheeks 11 and 12, connected transversely by front wall 13, rear wall 14, and base 9. These walls will be of any desired relative height and in one illustrative embodiment the front wall 13 is vertically relatively short and the rear wall is vertically relatively long. The side cheeks have three sets of aligned apertures, respectively front stay rod-receiving aperture 15, preferably disposed in shallow bosses 16 on the outer faces of the cheeks; rear stay rod-receiving aperture 17, preferably disposed in similarly shallow external bosses 18, and shaft-receiving aperture 20, preferably disposed in relatedly shallow external boss 21, and an internal boss 19.

It will be understood that when a pair of the base castings are brought into alignment and lateral contact, the respective external bosses of the plural aligned apertures form the lateral spacing contact points between the units. In assembly the juxtaposed units are rigidly clamped together by the stay bolts 22 and 23 passing respectively through the aligned stay bolt apertures 15 and 17 respectively, and a shaft 24 is rotatable in the aligned shaft apertures 17 with clearance and is suitably journalled in the respective terminal shaft aperture of the series of units in housing 1 or end plates 29, if provided.

Shaft 24 passes through the parallel cheeks of a base unit and slidably mounts an axially slidable "off" bushing 25 and a slidable "on" bushing 26. Each bushing comprises a cylinder of anti-friction material, preferably, such as "nylon," externally formed with a median annular flange or abutment, respectively 25' and 26'. The bosses 21 are externally recessed as at 27. Bushings 30, each having a flange 31, are inserted from the inner face of the cheeks 11 and 12, the inner cylindrical surfaces of which bushings are preferably out of contact with the shaft 24, and the outer free end of which bushings are disposed in the respective recesses 27. An "off" setting dial 40 is provided, comprising a planar web 41 and a cylindrical rim 42. The web 41 is centrally apertured or bored, as at 43, to seat upon the outer cylindrical surface of the flanged bushing 30, and the flange 31 abuttingly engages the web 41. The bushings may be integral with the webs, if desired. Spring washer 44 engages between the free end of the bushing and the surface of the external recess 27 and forces the web against the internal boss 19 of the cheek 11. The dial is manually settable by engagement by the operator of some exposed portion of the rim to manipulate the dial against the friction of the bushing, so that it retains an angularly attained position against disturbance from the movable portions to be described. It will be understood that the dial may be set at any time, even during the cyclic actuation of the programmer. A dial lock may be provided to prevent undesirable rotation of the dial due to vibrations. This may comprise a friction cam bearing against the rim or web.

An identical "on" setting dial is provided in reverse of the structure of the "off" dial, and is associated with cheek 12. The parts of the "on" setting dial are the same and bear the same reference characters as those of the "off" dial with primes. Both dials are graduated through the periphery of the rims, or wherever else desired, in 360° and their reasonable sub-divisions. Internally of the rim, but closely adjacent thereto in radial spacing from the axis of shaft 24 and in fixed radial relation to the respective zero calibration of the dials, are the relatively small cam wheels 50, journalled for free rotation about axes parallel to the shaft 24. A fixed reference plate 51 is mounted on the base casting as on front wall 13, and is disposed to lie between the dials 40 and 40' and has a datum graduation of "0" and preferably vernier graduations on each side thereof with reference to which the respective dials are manually set to determine the circuit intervals between time "on" and time "off."

A bracket 60 is clamped to the shaft 24 to turn therewith, and at its free end mounts an axle 61, or the like, upon which the bell crank clevis 62 is pivoted. One relatively short arm 63 of the latter extends generally parallel to the axis of the shaft 24 in position to engage and to be moved radially inward about the axis of axle 61 by the stationary wheel 50, in the cyclic progression of the bracket 60 with the shaft. The other arm, 64, of the bell crank is split into a fork or clevis, which straddles the bushing 25, and is in abutment against the flange 25' thereof. In the normal bushing setting it abuts against the clamp of the bracket 60. When the bell crank is actuated by reaction from the wheel or roller 50, the clevis end of arm 64 engaging the bushing moves the latter axially away from the clamp of bracket 60. The "on" organization at the right of Fig. 1 has the same organization as the "off" organization just described, and bears the same reference characters primed. In the preferred forms of the invention all of the parts so far described are standard, and of the remainder, to be described, the changes involved are concerned with the particular forms and orders of signals to be evoked and the modes of attaining same.

The brackets 60 and 60' are generally secured to the shaft 24 so as to lie in the same diametric plane thereof and to sweep together around the dials, but respectively actuated according to the instantaneously setting of the dials and the location of their respective camming wheels 50.

In all forms of the invention pivoted levers 73 and 73' are positioned for actuation by the axial movement of the respective bushings 25 and 26, by bushing-engaging lever ends, while some other parts, such as the other ends of the levers, are used to effect the desired signal controls. Lever 73 has a forked upper end 74 straddling the bushing 25, in impingement against the face of flange 25' thereof, opposite to the impingement of the clevis end 64 of the bell crank 62. The lever 73 engages a block 75 pivoted at 76 and has an illustratively relatively short lever end component 72. The respective upper end and the lower end of the lever each comprise lever arms relative to the pivot 76 controlled by the "off" dial setting in Fig. 1. In angularly staggered relation a similar lever organization 73' is provided for control by the "on" dial setting. This has an upper forked lever arm 74' straddling the axially slidable bushing 26, in impingement against the flange 26' thereof, the mounting block on a pivot slightly cocked relative to pivot 76 (not seen in the transverse section as it is behind the block 75), and the illustratively short lever arm 72'. It will be seen that with the organization as so far described, the levers may be of any desired relative lever arm lengths, may be straight levers or bell crank levers or may be levers of any class, instead of the first class shown, depending upon the signal organizations with which they are associated, and the necessities of the situation. Any desired biasing means, such as some form of spring 69 effective between levers 73 and 73' may be provided, to cause the upper forked ends to bear against the respective flanges 25' and 26' on the bushings, to urge the latter toward their axial abutment against the brackets, and thus to urge the bell crank levers 62 and 62' to remain in position for the short lever arms 63 and 63' to engage and be more or less momentarily depressed by the camming wheels 50. Preferably, although not essentially, the latter are effective during several degrees of shaft movement.

With the basic unit as thus described it will be understood that the cyclic actuation of the levers 73 and 73' respectively can be at any respective points on the 360° of shaft actuation. It then becomes necessary only to translate the cyclic movements of the lever arms 72 and 72' into useable signals. It will be apparent that the ability to exert a force in one sense by one lever followed by a force in an opposite sense affords control means for a wide variety of signals, whether electrical, or functions of fluid pressure or the like, according to the demands of the associated mechanism, as will be described, in purely illustrative forms hereinafter.

The shaft 24 is caused to rotate by any desired means, such as by direct, or remote, coupling to an apparatus having an angularly movable element for progressing shaft 24 in angular motion, and applied to either end of the shaft, or by a separate timing motor coupled through the usual reduction gears or other transmission to the shaft 24. In a multiplex of aligned units, or with one for that matter, the operator manually turns the respective "off" and "on" dials with respect to their peripheral graduations, against the basic zero on stationary jutaposed plate 51 to predetermine the relative angular settings of the camming wheels 50 of the respective "off" and "on" dials, to predetermine the angular motion "on" and the angular motion "off."

To indicate the flexibility of the system, reference may be made to Fig. 3, in which a single work circuit is controlled by a given unit. In this form of the invention the lever arms 72 and 72' actuate a dual stepping ratchet mechanism controlling the actuation of two single-pole double-throw contacts. A star wheel or the like 110 is provided rigidly keyed to a multiple dwell cam 111, and the latter is juxtaposed to the cam end of the resilient contact arm 112, having a lower contact 113 and an upper contact 114. Juxtaposed to the upper contact 114 is a relatively fixed contact 115, mounted on the flexible or resilient member 116 of one circuit. Juxtaposed to the lower contact 113 is the relatively fixed contact 117 mounted on the flexible or resilient member 118 in the other circuit. Stepping fingers 120 and 121 are mounted on the respective lever ends 72 and 72' in order to engage and progress said star wheel one step whenever a lever end 72 or 72' is actuated in the cyclic progression of the shaft 24. The bias of said median spring arm or mount 112 is such that with the terminal end between dwells of the cam, the lower contact 113 engages and closes a circuit through contact 117. The elevation of the free end of the arm 112 on a dwell of the cam wheel breaks the engagement of the lower contact 113 with contact 117 and establishes contact between the upper contact 114 and said fixed contact 115. Any desired circuitry can be associated with the stepping cam switching organization, as will be clear. It will also be clear that the intermittent rotation of the star wheel can be availed of for other signal results, as may be found desirable.

With electrical signals, switches, with or without hold-in, hold-out, and other relays, can effect various combinations of outputs for control purposes, by having the respective lever arms 72 and 72' actuate microswitches or the like, as will be readily understood. In Fig. 1a microswitches 80 and 81 and a relay 82 are disclosed as controlled by the lever organization of Fig. 1. Control in this illustrative case is obtained by a standard relay holding-in type of circuit.

There is one combination of actuated devices in the unit concept for electrical signal controls that should be mentioned specifically, as it not only is effective for electrical signals, but with substitution of fluid controls effects some unique control results. This is shown in fragmentary form in Fig. 2. In this figure a single-pole double-throw switch 90 is provided having a plunger switch member 91. In the normal untripped dispositions of the parts, the lever arm 72a of lever 73, the "on" switch controller, is a relatively weak flexible member, comprising a thin leaf spring, juxtaposed to one end of the common switch plunger element 91. On the other hand, the lever arm 72b of lever 73' is a relatively stiff and inflexible lever member comprising a heavy leaf spring juxtaposed to the switch plunger member 91 at the other end thereof. The switch member 91 is a common operating plunger passing through the body of the switch, which actuates its contacts in one position or the other by motion of its operating plunger 91 in one direction or the other. This allows for short contact durations as the switch can be depressed to its "on" position by the light leaf spring arm 72a described, and can be immediately reset an instant later to "off" by the heavy leaf spring 72b opposing the weaker thin leaf spring by the stiffness of the heavier arm through the plunger switch member 91.

The unit system has a further important signal control function when used in connection with fluid pressure controls, such as for hydraulic switch or poppet valve operations and in other types of electrical signals.

In Figs. 4 and 5 a purely schematic diagram of a hydraulic switch in association with an actuated servomotor is disclosed. In this organization the plunger 91a extends in both directions of a balanced type slide valve 92 in a valve chamber 93 supplied by fluid pressure through an inlet 94. The valve controls outlets leading to a servomotor cylinder 95 containing an actuated piston 96. The return to sump is not shown as these hydraulic switch organizations per se are well known in the art and any may be used as may be desired such, illustratively, as Beck Patent No. 2,654,348. It is deemed sufficient to state that movement of the valve in one direction places fluid pressure behind the piston 96 to move it in one direction, while exhausting the other side of the piston, whereas actuation of the valve in the other direction places pressure on the opposite face of the piston while exhausting the fluid on the opposite face thereof. A leaf spring 97 is provided with suitable supports as to engage the plunger 91a to move and to hold the valve closed in one position as shown in Fig. 4, and to move and to hold the valve open in the other position, as shown in Fig. 5. In order to effect this control function the lever leaf spring 72a abuts one end of the plunger 91a, while the heavier leaf spring 73a abuts the opposite end thereof. By this means the unit can selectively move the piston in one direction or the other functionally with the "on" and "off" angular relations to the total revolution of the shaft.

A variation of the same scheme in a simplified electrical switching organization can be effected, as shown in Figs. 6 and 7. In this case, the plunger 91b in its axial motions in response to the respective actuations by levers 72a and 73a, working in leaf spring 97a, flexes the spring in opposite directions and holds it in the attained position until again forcibly moved. The ends of the spring 97a mount contacts 98 (which obviously may be double contacts presenting in opposite directions) and selectively bridge stationary contacts 100 (and alternatively, with double contacts 98 bridge stationary contacts 101) so as, at least as far as the circuit through contacts 100 is concerned, to bridge the circuit for a certain angular shaft motion and to open it for another certain shaft motion.

Mention has been made of poppet valve actuation and control by the unit system herein described. In the application of Macgeorge and Brown, Ser. No. 299,404, filed July 17, 1942, now matured into Patent #2,722,234, dated November 1, 1955, there is disclosed a poppet valve controlled in a snap actuation between two extreme settings in accordance with variations in the bleed rate from a bleed orifice of the valve. This controls fluid pressure, the output of which is varied with said snap action as a flapper valve moves between substantial throttling of the bleed and opening of the bleed orifice.

As shown in schematic form in Fig. 8, a pair of such poppet valves, respectively 102 and 103 may be provided having fluid "on" and "off" situations, as may be desired. Each has a bleed orifice 104, and these are juxtaposed respectively to the lever portions 72 and 72' formed as flapper valves. The air switch organization shown in this figure is arranged to throttle the "on" poppet valve to actuate its valve member, then in due course of predetermined angular motion to throttle the "off" poppet valve to actuate its valve member, as will be clear.

When it is desired to have a single poppet valve selectively actuated between "on" and "off" by the successive motions of the levers, a device related to the disclosure of Figs. 6 and 7 may be resorted to, as shown in Fig. 10. In this form of the invention the plunger element 91c is positioned either eccentric of the valve body or formed with external connections between its limits, as will be obvious, so that the combined leaf spring and flapper valve element 97a moves toward throttling the orific 104 of the poppet valve in one sense of plunger movement, or toward opening same in the other sense of plunger movement in response to the sequential actuation of the opposing lever elements 72b and 72a.

The foregoing signal organizations responsive to the sequential forces developed by the unit functioning are purely illustrative of the many that are available and will be apparent to those skilled in the art, and such are to be construed as within the scope of the invention.

It will be seen that the invention herein is of great elasticity, and that a number of basic units may be provided which can be assembled into the selected programmer by providing the shaft of the desired length, assembling the brackets and bushings thereon, and clamping the parts together. If desired, housings may be provided to enclose the parts during operation, separate end plates which journal the shaft may be provided as part of the ornamental housing effects, and any desired control functions can be secured from the same common complete programming unit. Thus, if desired, one or more units may control electrical circuits, one or more may control fluid pressure flows, such as for pneumatic control systems, and one or more may also be used for hydraulic relay operations. For an illustration of this diverse organization reference may be made to Fig. 12. This schematic illustration incorporates "n" units, and also illustrates one type of reset organization that may be incorporated in the apparatus when this is desired.

Referring to this figure, the shaft 24 mounts a pulley or the like 110 to which one end of a spring 111 is secured, which turns shaft 24 to its zero angular setting when free to do so. A stop 112 is mounted on the pulley 110 for abutment against a stationary stop 113 when the pulley and shaft are pulled back to the zero setting. The shaft 24 is common to and actuates a plurality of units as described, respectively designated "a," "b," "c," "d," "e," "f," "g," "h," "i," "j," "k," "l," "m," "n." Unit "a" controls "on" and "off" signals illustratively of type 1; "b" controls "on" and "off" signals of type 2; "c" controls "on" and "off" signals of type 3; "d" controls "on" and "off" signals of type 1; and so on. It will be understood that the types listed are related to the character of signal involved. Thus, for instance, type 1 may be electrical signals; type 2 may be fluid pressure signals; type 3 may be hydraulic flow signals; and so on. In this connection it will be understood, of course, that "fluid" describes both compressible and relatively incompressible fluids, whether gases or liquids. The same characteristics of different signal types can be incorporated in any plural unit. In addition to these separated individual signals from the respective units of a plurality of units, it will also be apparent that complex interlocking or interacting signals may be effected from two or more units in the programmer, whether electrical, or pneumatic, or hydraulic, or mixtures thereof.

It will be apparent that the shaft 24 of Fig. 12 may omit the pulley and spring organization if desired, and be actuated by any torque force in a continuous manner, or it may be intermittently advanced as by pulsing mechanism or pawl and ratchet solenoid or related actuation. However, as noted, Fig. 12 discloses a source of torque, 115, which may be a drive motor, or a connection to a rotatable element of an associated apparatus. The source may be continuously or intermittently actuated and through shaft 24' rotates one side of a clutch device 116, the other side of which, when the clutch is engaged, drives shaft 24. The clutch may be an electrical or mechanical clutch. It may be controlled between clutching and unclutching by a given signal of a given unit from "a" to "n" at the completion of the total time cycle of the sequence. As the shaft 25 is progressed during the clutch engagement, the spring 111 is loaded. When the clutch is disengaged the spring exerts force on the pulley or the like 110 to return the shaft 24 and the mechanism mounted thereon back to the zero setting. Further actuation of the programmer may start immediately by having the return to zero reengage the clutch, or it may rest on zero until some collateral signal is used to reengage the clutch to start a new cycle.

The flexibility, economy, and the other advantages and utilities of the invention are believed to be clear.

Having thus described my invention, I claim:

1. A sequence controller comprised of a pair of spaced generally planar parallel supports having aligned apertures and means for holding said supports in fixed relation defining a compartment, first and second dials mounted on said respective supports in spaced relation in said compartment in general parallelism with said supports and disposed for manual angular positioning in said compartment, first camming means mounted on said first dial inwardly of the periphery thereof, second camming means mounted on said second dial inwardly of the periphery thereof, a driven shaft in said apertures and extending across said compartment, bracket means mounted on said shaft in said compartment inwardly of said dials, a first bell crank lever pivotally mounted on said bracket means in the space between said dials having one arm directed toward said first dial in position to intersect and react from the said camming means thereof and one arm directed toward said shaft for movement generally axially of the latter in response to such reaction, a second bell crank lever pivotally mounted on said bracket means in the space between said dials having one arm directed toward said second dial to intersect and react from the camming means thereof and one arm directed toward said shaft for movement generally axially thereof in response to said last mentioned reaction, and means responsive to the actuations of the respective arms directed toward said shaft.

2. A sequence controller as in claim 1 in which the dials are peripherally graduated, the respective camming means are immovably fixed in angular setting on the respective dials, and a means is provided between the dials substantially closing said compartment and bearing a datum reference by which said dials are adjusted.

References Cited in the file of this patent

UNITED STATES PATENTS

| 864,048 | Tropp | Aug. 20, 1907 |
| 1,745,707 | Perrett | Feb. 4, 1930 |
| 1,828,126 | Brown | Oct. 20, 1931 |
| 2,019,766 | Peterson | Nov. 5, 1935 |
| 2,096,620 | Robertson | Oct. 19, 1937 |
| 2,574,841 | Powell et al. | Nov. 13, 1951 |
| 2,763,819 | Bradshaw | Sept. 18, 1956 |

FOREIGN PATENTS

| 432,170 | Italy | Mar. 15, 1948 |